US009075747B2

(12) United States Patent
Ishii et al.

(10) Patent No.: US 9,075,747 B2
(45) Date of Patent: Jul. 7, 2015

(54) BUS CONTROLLER AND CONTROL UNIT THAT OUTPUTS INSTRUCTION TO THE BUS CONTROLLER

(71) Applicant: Panasonic Corporation, Osaka (JP)

(72) Inventors: Tomoki Ishii, Kyoto (JP); Takao Yamaguchi, Osaka (JP); Atsushi Yoshida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 339 days.

(21) Appl. No.: 13/680,268

(22) Filed: Nov. 19, 2012

(65) Prior Publication Data

US 2013/0080671 A1    Mar. 28, 2013

Related U.S. Application Data

(63) Continuation of application No. PCT/JP2011/002681, filed on May 13, 2011.

(30) Foreign Application Priority Data

May 27, 2010    (JP) .................................. 2010-121899

(51) Int. Cl.
*G06F 13/14*    (2006.01)
*H04L 12/70*    (2013.01)
(Continued)

(52) U.S. Cl.
CPC ................. *G06F 13/14* (2013.01); *H04L 12/50* (2013.01); *H04L 45/00* (2013.01); *H04L 45/12* (2013.01); *H04L 45/124* (2013.01)

(58) Field of Classification Search
CPC ......... G06F 13/14; H04L 12/50; H04L 45/00; H04L 45/12; H04L 45/124

USPC .......................................................... 710/110
See application file for complete search history.

(56) References Cited

U.S. PATENT DOCUMENTS

| 5,940,372 A | 8/1999 | Bertin et al. |
| 5,959,995 A | 9/1999 | Wicki et al. |

(Continued)

FOREIGN PATENT DOCUMENTS

| JP | 09-036893 A | 2/1997 |
| JP | 2010-130032 A | 6/2001 |

(Continued)

OTHER PUBLICATIONS

Pionteck, T.; Koch, R.; Albrecht, C., "Applying Partial Reconfiguration to Networks-On-Chips," Field Programmable Logic and Applications, 2006. FPL '06. International Conference on , vol., no., pp. 1,6, Aug. 28-30, 2006.*

(Continued)

*Primary Examiner* — Ryan Stiglic
(74) *Attorney, Agent, or Firm* — Renner, Otto, Boisselle & Sklar, LLP

(57) ABSTRACT

A bus controller is arranged on a plurality of network communication buses that connect together a plurality of bus masters, each sending out a packet, and at least one node, to which the packet is sent from each said bus master, in order to control the transmission route of a packet that is flowing through the plurality of communication buses. The bus controller includes: a route diagram manager configured to manage a plurality of transmission routes and their respective transmission statuses; a parameter generator configured to generate either a parameter that conforms to a predetermined probability distribution or a parameter that follows a predefined rule; a processor configured to select one of the plurality of transmission routes based on the respective transmission statuses of the transmission routes and the parameter; and a relay configured to perform relay processing on the packet that is flowing through the communication bus.

8 Claims, 10 Drawing Sheets

(51) Int. Cl.
*H04L 12/701* (2013.01)
*H04L 12/721* (2013.01)
*H04L 12/50* (2006.01)

(56) References Cited

U.S. PATENT DOCUMENTS

| | | | |
|---|---|---|---|
| 7,522,538 B2 * | 4/2009 | Rhim et al. | 370/254 |
| 7,961,721 B2 * | 6/2011 | Denteneer et al. | 370/359 |
| 8,270,316 B1 * | 9/2012 | Chang et al. | 370/254 |
| 8,638,665 B2 * | 1/2014 | Takagi et al. | 370/235 |
| 2006/0161875 A1 * | 7/2006 | Rhee | 716/14 |
| 2008/0069094 A1 * | 3/2008 | Lee et al. | 370/389 |
| 2009/0066366 A1 * | 3/2009 | Solomon | 326/41 |
| 2009/0067343 A1 * | 3/2009 | Fritz | 370/254 |
| 2009/0213863 A1 * | 8/2009 | Denteneer et al. | 370/412 |
| 2009/0323540 A1 * | 12/2009 | Goossens et al. | 370/252 |
| 2010/0002589 A1 * | 1/2010 | Ciordas et al. | 370/241 |
| 2010/0019827 A1 * | 1/2010 | Tamura et al. | 327/403 |
| 2011/0026405 A1 * | 2/2011 | Takagi et al. | 370/235 |
| 2011/0060831 A1 | 3/2011 | Ishii et al. | |
| 2011/0093854 A1 * | 4/2011 | Blanc et al. | 718/101 |

FOREIGN PATENT DOCUMENTS

| | | |
|---|---|---|
| JP | 2002-247087 A | 8/2002 |
| JP | 3816531 B | 6/2006 |
| JP | 2007-074074 A | 3/2007 |
| JP | 2007-325032 A | 12/2007 |
| JP | 2010-056818 A | 3/2010 |
| WO | 2009/150849 A1 | 12/2009 |

OTHER PUBLICATIONS

Ahmad, B.; Erdogan, A.T.; Khawam, S., "Architecture of a Dynamically Reconfigurable NoC for Adaptive Reconfigurable MPSoC," Adaptive Hardware and Systems, 2006. AHS 2006. First NASA/ESA Conference on , vol., no., pp. 405,411, Jun. 15-18, 2006.*

S. Jovanović, C. Tanougast, C. Bobda, S. Weber, CuNoC: A dynamic scalable communication structure for dynamically reconfigurable FPGAs, Microprocessors and Microsystems, vol. 33, Issue 1, Feb. 2009, pp. 24-36.*

International Search Report for corresponding International Application No. PCT/JP2011/002681 mailed Jun. 7, 2011.

International Preliminary Report on Patentability for corresponding International Application No. PCT/JP2011/002681 mailed Jul. 10, 2012.

Wakita et al., "Delay Reduction Algorithm by Balancing Distribution of Traffic for Odd-Even Turn Model in NoC", IEICE Technical Report, vol. 108, No. 478, Mar. 11, 2009, pp. 153 to 158 with English Abstract.

* cited by examiner

| START ADDRESS | END ADDRESS | MEMORY ID |
|---|---|---|
| 0x00000000 | 0x3FFFFFFF | 00 |
| 0x40000000 | 0x7FFFFFFF | 10 |

FIG.16

| DESTINATION | ROUTE | EVALUATION VALUE (Ei) |
|---|---|---|
| DRAM0 (00) | ROUTE 000102 | 112 |
| | ROUTE 001102 | 62 |
| DRAM1 (10) | ROUTE 000112 | 30 |
| | ROUTE 001112 | 23 |

FIG.17

| FLOW ID | SOURCE | DESTINATION | ROUTE NUMBER |
|---|---|---|---|
| 1 | CPU | 00 | 0 |
| 2 | DMAC0 | 00 | 0 |
| 3 | DSP | 00 | 1 |

FIG.18

| FLOW ID | SOURCE | DESTINATION | ROUTE NUMBER |
|---|---|---|---|
| 1 | CPU | 00 | 0 |
| 2 | DMAC0 | 00 | 1 |
| 3 | DSP | 00 | 1 |

BUS CONTROLLER AND CONTROL UNIT THAT OUTPUTS INSTRUCTION TO THE BUS CONTROLLER

This is a continuation of International Application No. PCT/JP2011/002681, with an international filing date of May 13, 2011, which claims priority of Japanese Patent Application No. 2010-121899, filed on May 27, 2010, the contents of which are hereby incorporated by reference.

BACKGROUND

1. Technical Field

The present application relates to an apparatus, method and program for controlling a communication bus which is implemented as a network on a semiconductor chip.

2. Description of the Related Art

Recently, as the functionalities of SoC (system on chip) and processors have been further enhanced, NoC (network on chip) that is a network type bus has attracted more and more attention and has been replacing ordinary communication buses. In an NoC, a lot of bus masters and memories can be connected together.

FIGS. 1A and 1B illustrate a configuration for a part of an NoC bus. Specifically, FIG. 1A illustrates an exemplary hardware connection and FIG. 1B is a schematic representation thereof. As shown in FIGS. 1A and 1B, bus masters 1a, 1b and 1c, all of which are integrated together on a single chip 10, are connected to the same bus 3 by way of their associated bus masters (R) 2. It should be noted that in the drawings of this application, an NoC bus is represented as in the schematic representation shown in FIG. 1B.

FIG. 2 illustrates an exemplary configuration for an NoC bus in which a number of bus masters are coupled together to form a two-dimensional mesh. In this example, a router node R for performing a control on a data transfer route is provided for each of various bus masters including microprocessors, DSPs, memories and input/output circuits. And two adjacent ones of those router nodes R are connected (i.e., linked) together with a short line. In this description, the router node R will also be referred to herein as sometimes a "router" and sometimes a "bus controller".

In such a configuration, data can be transferred from a bus master on the transmitting end (i.e., source) to a bus master on the receiving end (i.e., destination) through a number of different communication routes. For example, FIG. 3 illustrates three routes (1), (2) and (3) leading from the source to the destination.

By choosing the best one of multiple candidate routes according to the load imposed on the bus, the data to transfer can be efficiently distributed over the entire chip and an increase in average bus use efficiency can be expected. That is why the throughput of the overall bus increases, the operating frequency of the bus can be reduced during a design process or during the operation, and the power dissipated by the chip can be cut down. In addition, since the data transfer latency (time delay) between bus masters can be reduced, the performance of the bus masters can be made full use of, which eventually leads to improving the overall processing performance of the chip.

Japanese Patent No. 3816531 discloses a method for choosing one of multiple data transfer routes according to the status of a bus that connects multiple bus masters together. According to the technique disclosed in Japanese Patent No. 3816531, data is transferred on a frame-by-frame basis from a bus master on the transmitting end to a bus master on the receiving end. If the frame transmitted has been received successfully at the receiving end, acknowledge data is returned. Otherwise, no acknowledge data is returned. Thus, if no acknowledge data is returned, the bus master on the transmitting end senses that the transfer of that frame has failed. In that case, the bus master changes the transfer routes into another one and re-transmits that frame through it. In this manner, communications can be continued. If any error has been detected in the header of the frame received, then the bus master on the receiving end discards that frame, and therefore, the bus master on the transmitting end never receives any acknowledge data in that case. Likewise, if the frame transfer latency on the data transfer route currently chosen is too long for the frame to arrive at the receiving end within a predetermined period of time, the bus master on the transmitting end cannot receive the acknowledge data within the predetermined time. Then, the routes also need to be changed. By changing the data transfer routes dynamically in this manner according to the status of the route currently used, communications can be made through a route with less transfer latency or error.

SUMMARY

The conventional technique needs further improvement in view of the route change and the average use efficiency of the bus.

One non-limiting, and exemplary embodiment provides a bus controller (or router) which can shorten the route change delay by minimizing such bus resource contention while changing the routes and which can increase the average use efficiency of the bus.

In one general aspect, a bus controller disclosed herein is arranged on a plurality of network communication buses that connect together a plurality of bus masters, each sending out a packet, and at least one node, to which the packet is sent from each said bus master, in order to control the transmission route of a packet that is flowing through the plurality of communication buses. The bus controller comprises: a route diagram manager configured to manage a plurality of transmission routes leading from the respective bus masters to the at least one node and their respective transmission statuses; a parameter generator configured to generate either a parameter that conforms to a predetermined probability distribution or a parameter that follows a predefined rule; a processor configured to determine the transmission routes leading from the respective bus masters to the at least one node based on the respective transmission statuses of the transmission routes and the parameter so that the packets sent out from the bus masters are distributed over the plurality of transmission routes; and a relay configured to perform relay processing on the packet that is flowing through the communication buses following the transmission routes that have been determined by the processor.

According to the above aspect, either a parameter that conforms to a predetermined probability distribution or a parameter that follows a predefined rule is generated. A transmission route is newly selected based on that parameter and the respective transmission statuses of the transmission routes. As a result, in a general network bus to which multiple bus masters that operate independently of each other are connected, it is possible to avoid a decline in throughput that would be caused by contention over the limited resource if the respective bus masters changed the transmission routes based on their selfish decisions. Consequently, the increase in latency due to such contention can be minimized. In addition, as the throughput is increased, the operating frequency of the bus itself can be set to be a lower value. As a result, the power dissipation of the bus itself can be cut down, too.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 16 shows an example of a route diagram to be managed by the route diagram manager 102 on the bus controller R00.

FIG. 17 shows an example of a flow diagram.

FIG. 18 shows what the flow diagram is like when a route, of which the flow has a flow ID of 2, has been changed in the communication status indicated by the flow diagram shown in FIG. 17.

DETAILED DESCRIPTION

Figure 1A:
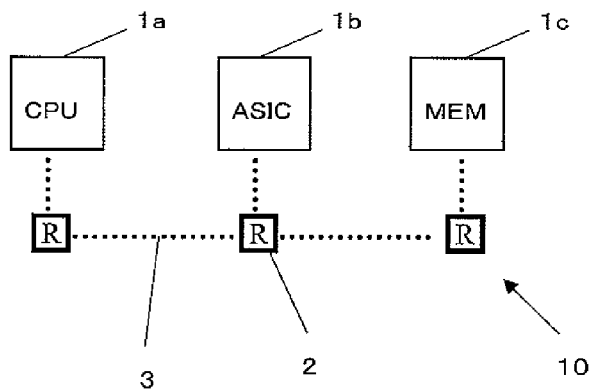
FIGS. 1A and 1B illustrate a configuration for a part of an NoC bus.
Figure 1B:
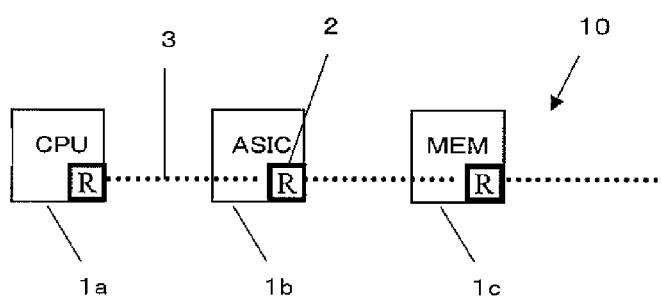
Figure 2:
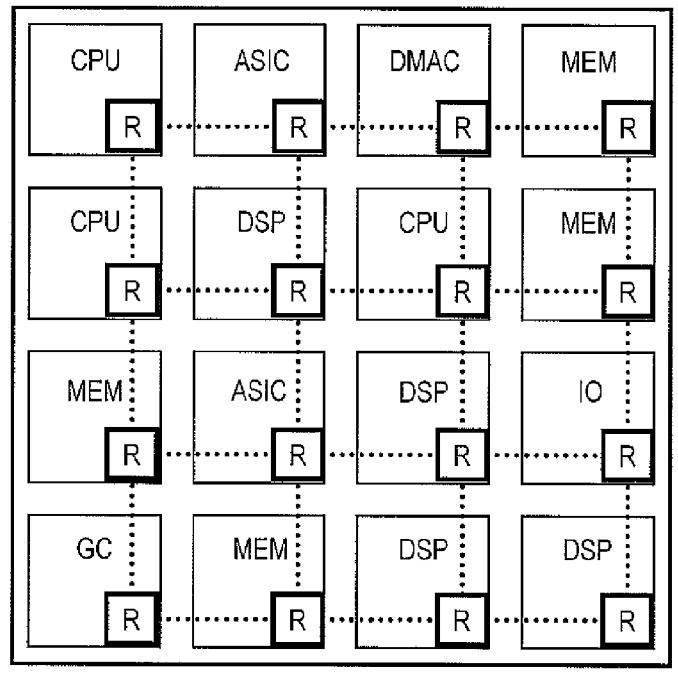
FIG. 2 illustrates an exemplary configuration for an NoC bus in which a number of bus masters are coupled together to form a two-dimensional mesh.
Figure 3:
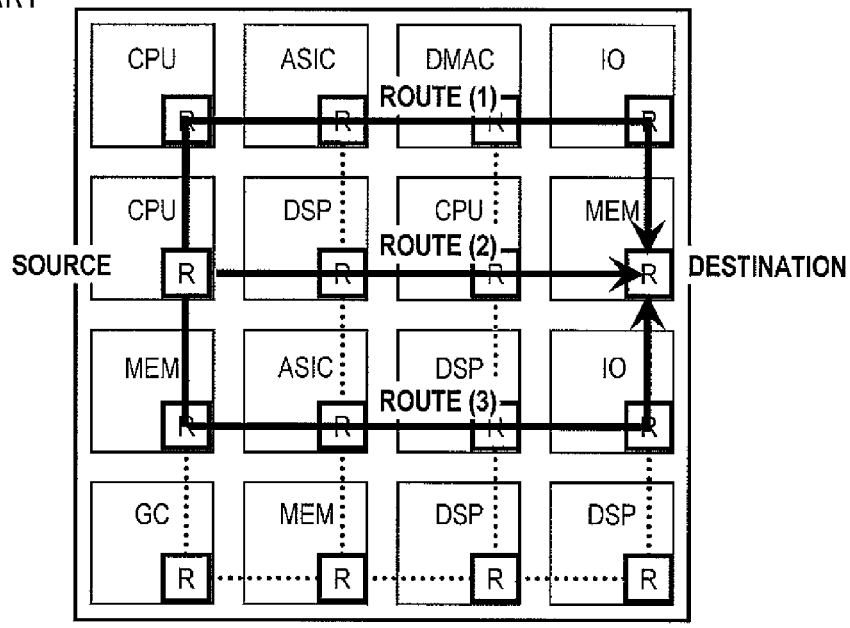
FIG. 3 illustrates three routes (1), (2) and (3) leading from the source to the destination.

Before specific embodiments of the present disclosure are described, first of all, the problem of the conventional technique will be described.

If the known multi-route control technique is adopted, the bus master on the transmitting end decides that the data transfer routes need to be changed on sensing an increase in transfer time delay and chooses the best route selfishly so as to optimize its own data transfer status. In other words, by changing the routes to use from a heavily loaded one into a lightly load one, the bus master on the transmitting end tries to cut down the transfer time delay.

However, even if each of multiple bus masters that operate independently of each other on a general NoC changes the routes by such a known method, data transfer performance cannot always be improved. The reason is that as multiple bus masters operating independently on the NoC contend with each other to get the best route available, some data transfer route or link resource will be scrambled for by a number of bus masters and data will have to be transferred from multiple different sources through only a few links. As a result, the flow rates of the data streams to be transferred which are flowing through the respective routes will become even more uneven.

In such a situation, the transfer time delay gets even longer due to such an uneven distribution of the flow rates of the data to be transferred, and the respective bus masters have to choose the route over and over again, thus causing a significant increase in time delay involved with changing the routes. Furthermore, a significant increase in the latency of the data transfer becomes a decisive factor that determines the operation rates of those bus masters. For example, when data is transferred between a processor and a memory, the memory access latency increases the overall length of wait cycles for the processor, which will lead to a decline in performing performance. On top of that, as the throughput declines due to the contention, the power dissipated by the bus increases, too. The reason is that unless the operating frequency of the bus is increased, the intended bus transfer ability cannot be achieved. The power dissipated by the bus is represented by the power dissipation P of transistors that form the bus. The power dissipation P is represented by the following Equation (1):

$$P = \alpha \cdot C \cdot V^2 \cdot f \qquad (1)$$

where α denotes the switching rate, C denotes the capacitance of the circuit, V denotes the supply voltage and f denotes the operating frequency. It should be noted that the "transistors that form the bus" include herein the transistors of network elements (such as router nodes) which are located between a network element that transmits data and a network element that receives that data.

Furthermore, by decreasing the operating frequency, the supply voltage can also be reduced as represented by the following Equation (2):

$$V = \frac{C}{(1-\eta)^\gamma} \cdot f^{\frac{1}{\gamma-1}} \qquad (2)$$

In Equation (2), η denotes the ratio of the operating threshold voltage of the transistor to the supply voltage and γ denotes a constant that depends on the process rule. For example, if γ=2, a decrease in operating frequency will reduce the power dissipation P to the third power. That is why the power dissipation of the link that should cope with a high transfer rate could be very large due to such unevenness of the throughput.

The present inventors perfected the present disclosure in order to overcome these problems by providing a bus controller (or router) which can shorten the route change delay by minimizing such bus resource contention while changing the routes and which can increase the average use efficiency of the bus.

A bus controller according to the present disclosure is arranged on a plurality of network communication buses that connect together a plurality of bus masters, each sending out a packet, and at least one node, to which the packet is sent from each said bus master, in order to control the transmission route of a packet that is flowing through the plurality of communication buses. The bus controller includes: a route diagram manager configured to manage a plurality of transmission routes leading from the respective bus masters to the at least one node and their respective transmission statuses; a parameter generator configured to generate either a parameter that conforms to a predetermined probability distribution or a parameter that follows a predefined rule; a processor configured to determine the transmission routes leading from the respective bus masters to the at least one node based on the respective transmission statuses of the transmission routes and the parameter so that the packets sent out from the bus masters are distributed over the plurality of transmission routes; and a relay configured to perform relay processing on the packet that is flowing through the communication buses following the transmission routes that have been determined by the processor.

The bus controller may further include a switch configured to switch the packet's transmission route into a new transmission route that has been newly selected by the processor. The relay may transmit the packet through the new transmission route to which the older route has been switched by the switch.

By seeing if the parameter falls within a selection probability range to be calculated based on an evaluation value indicating the transmission status, the processor may determine whether or not to switch to a transmission route associated with the selection probability.

The processor may select the route by reference to a probability distribution which is proportional to the smoothness of the transmission statuses of the respective routes.

With respect to the flow of a packet, of which the transfer rate is higher than a reference value, the processor may correct the selection probability of the route currently used and may limit route switching probability.

The route diagram manager may find a route, of which the transmission status is short of a predefined standard, as a route to be switched. The parameter generator may generate the parameter by using either a random number that is based on thermal noise or a random number that is based on a uniform distribution, a Poisson distribution or a Gaussian distribution. And the processor may calculate, with respect to the flow of a packet to be transmitted through the route to be switched, an evaluation value that increases as the transmission status worsens, and may see if the parameter falls within the range of the evaluation value, thereby determining whether or not the route needs to be switched into a transmission route associated with the evaluation value.

The route diagram manager may find a route, of which the transmission status is short of a predefined standard, as a route to be switched. The parameter generator may generate the parameter by using a counter that changes regularly. And the processor may calculate, with respect to the flow of a packet to be transmitted through the route to be switched, an evaluation value that increases as the transmission status worsens, and may see if the parameter falls within the range of the evaluation value, thereby determining whether or not the route needs to be switched into a transmission route associated with the evaluation value.

A control unit according to the present disclosure outputs an instruction to a bus controller that is arranged on a plurality of network communication buses that connect together a plurality of bus masters, each sending out a packet, and at least one node, to which the packet is sent from each said bus master, in order to control the transmission route of a packet that is flowing through the plurality of communication buses. The control unit includes: a route diagram manager which manages a plurality of transmission routes leading from the respective bus masters to the at least one node and their respective transmission statuses; a parameter generator configured to generate either a parameter that conforms to a predetermined probability distribution or a parameter that follows a predefined rule; and a processor configured to determine the transmission routes leading from the respective bus masters to the at least one node based on the respective transmission statuses of the transmission routes and the parameter so that the packets sent out from the bus masters are distributed over the plurality of transmission routes and configured to output an instruction on the transmission routes that have been determined to the bus controller.

Hereinafter, embodiments of a bus controller according to the present disclosure will be described with reference to the accompanying drawings.

Embodiment 1

Before a bus controller as an embodiment of the present disclosure is described in detail, will be described exactly on what principle a communication bus called an "NoC (network on chip")", transmission routes that can be used in the communication bus, and a bus controller according to this embodiment operate.

Figure 4:
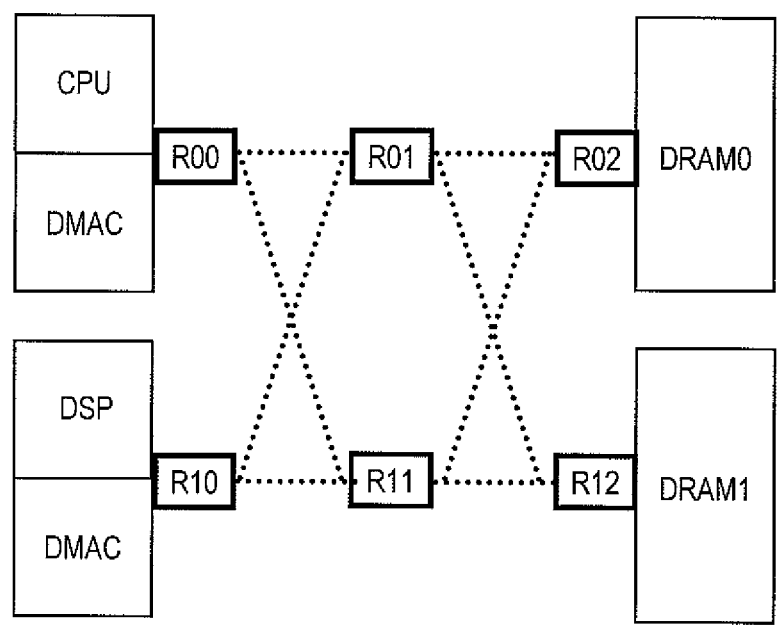
FIG. 4 illustrates an example in which a system semiconductor memory-to-memory interface to be built in an integral device is implemented as an NoC bus, which is a multi-stage connection network with a butterfly form.

FIG. 4 illustrates an example in which a system semiconductor memory-to-memory interface to be built in an integral device is implemented as an NoC bus, which is a multi-stage connection network with a butterfly form. In FIG. 4, one CPU, two DMACs and one DSP as bus masters and DRAM0 and DRAM1 as memory controllers are connected together in multiple stages via a plurality of two-input, two-output router nodes Rxy (where x=0, 1 and y=0, 1, 2). This configuration is a unidirectional bus in which a data stream flows only from the bus masters toward the memory controllers. Actually, however, there are not only accesses from bus masters to memories but also transfers in the opposite direction from memories to bus masters. In the latter case, the same butterfly network as what is used in this example to transfer data from bus masters to memories is just duplicated to transfer data in the opposite direction. And both of those two networks have the same principle of operation. That is why only the network of transferring data from bus masters to memories will be described with description of the operation on the returning routes omitted.

Figure 5:
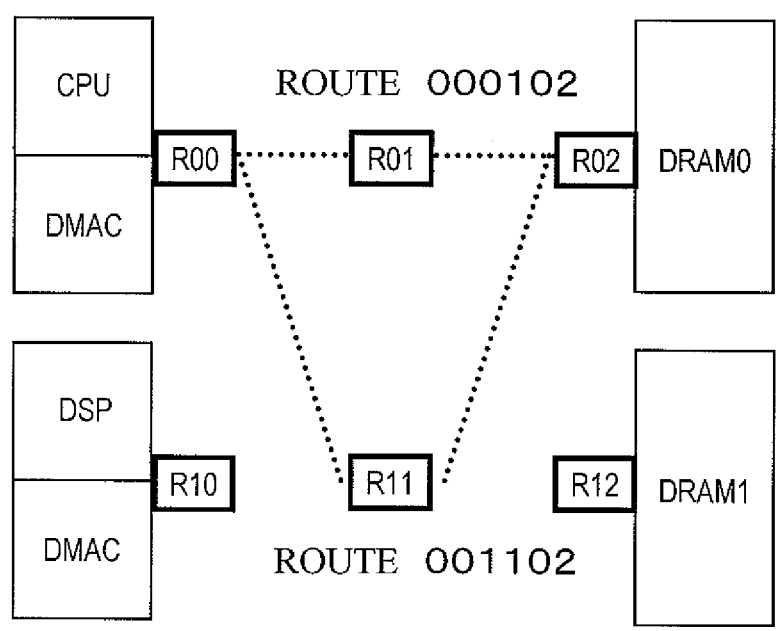
FIG. 5 shows that two routes "000102" and "001102" are available for CPU to gain access to DRAM0.

In FIG. 4, in transferring data from a bus master to any of the two memory controllers, two different transfer routes can be used. FIG. 5 shows that two routes "000102" and "001102" are available for the CPU to gain access to DRAM0. Although not shown in FIG. 4, two different routes are available for any other bus master to have access to any of the two memories.

In the description of this embodiment, each route is identified by the combination of the reference numerals that are allocated to respective router nodes on that route. For example, among multiple routes leading from the CPU to DRAM0, the route that passes through the router nodes R00, R01 and R02 will be referred to herein as a "route 000102", while the route that passes through the router nodes R00, R11 and R02 will be referred to herein as a "route 001102".

Figure 6:
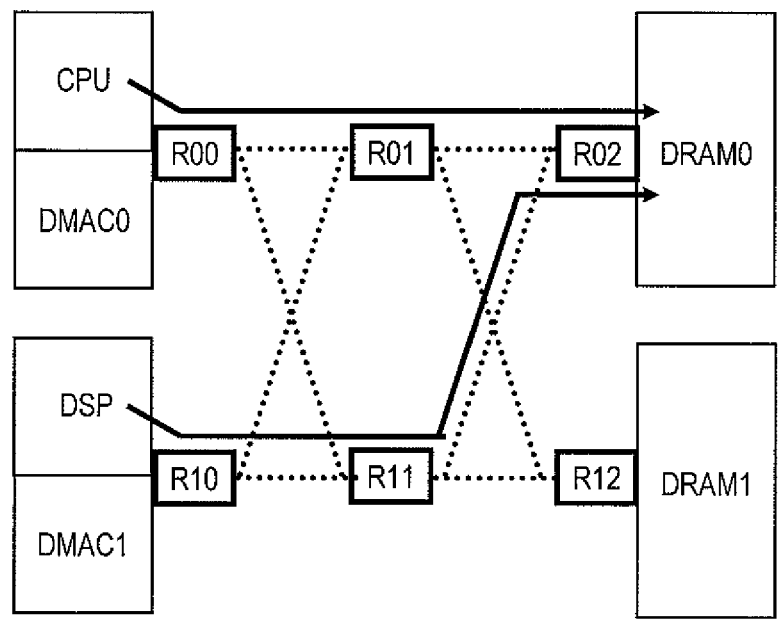
FIG. 6 shows how an OS or application executed by the CPU is accessing DRAM0 through the route "000102".

FIG. 6 shows how an OS or application executed by the CPU is accessing DRAM° through the route "000102" and also shows how a microcode operating on the DSP is accessing DRAM0 through the route "101102". In these situations, no matter which of these memory access flows is taken, the memory access is supposed to be done within permitted average access latency.

Figure 7:
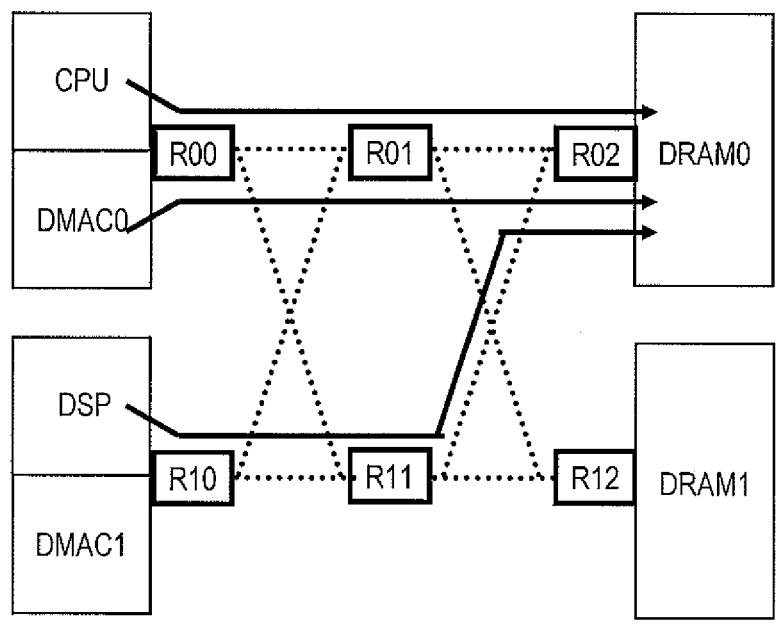
FIG. 7 shows how DMAC0, which is a peripheral device for the CPU, has started to transfer data to DRAM0 through the route "000102" in the situation shown in FIG. 6.

FIG. 7 shows how DMAC0, which is a peripheral device for the CPU, has started to transfer data to DRAM0 through the route "000102" in the situation shown in FIG. 6. If the average access latency of the CPU and DMAC0 has exceeded a permitted value due to the influence of the newly generated memory access flow, then the CPU and DMAC0 change their data transfer routes.

Suppose the fixed transfer delay that needs to be allowed for a data transfer packet to pass through the NoC bus with no load imposed is 12 cycles and the average latency to be caused when the CPU or DMAC0 is accessing DRAM0 is 112 cycles with the route 000102 adopted and is 62 cycles with the route 001102 adopted. The latency increases according to the quantity of the data flowing and the degree of access contention at the output stage of a router node. That is why the latency of the route 000102 is greater than that of the route 001102.

Figure 8:
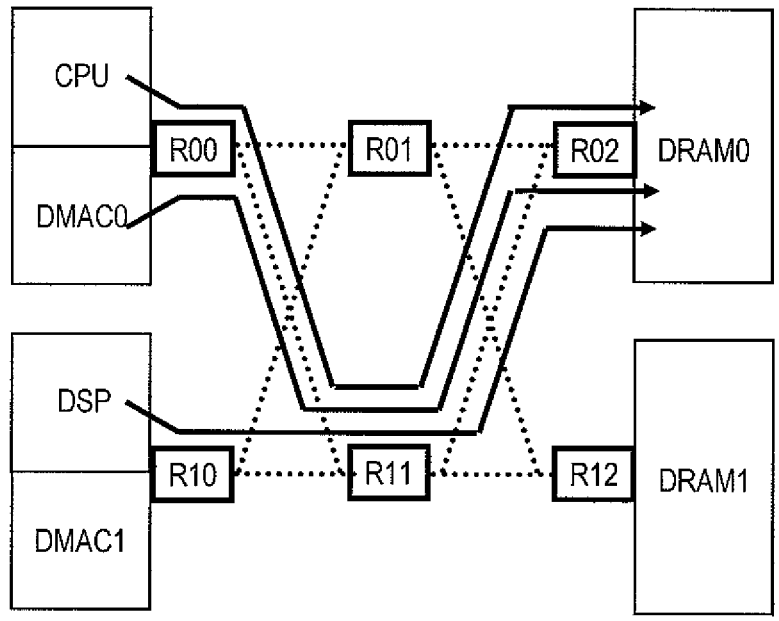
FIG. 8 shows how the memory access loads of the respective bus masters are concentrated on the router nodes R11 and R00 as a result of the route change.

According to a known route change method, both the CPU and DMAC0 change their routes at a time from the route 000102 with the higher average latency into the route 001102 with the lower average latency. FIG. 8 shows how the memory access loads of the respective bus masters are concentrated on the router nodes R11 and R00 as a result of the route change. Since the loads have been concentrated on the router nodes E11 and R00, the memory access status determined by the respective flows further worsens.

According to this embodiment, by adding a probability-based behavior to the route change operation (i.e., by changing the routes on a probability basis), such a problem caused by the route contention is overcome. For example, in the instance shown in FIG. 7, routes are selected on a probability basis at a ratio that is inversely proportional to the ratio of the average latency of the route 000102 (112 cycles) to that of the route 001102 (62 cycles). Specifically, in this case, the probability of selecting the route 000102 is 0.4 and the probability of selecting the route 001102 is 0.6 for both of the CPU and DMAC0. As a result, the routes to be changed when a plurality of bus masters are going to change the routes at the same time can be distributed on a probability basis. Consequently, it is possible to avoid the contention over limited route resources as shown in FIG. 8.

Figure 9:
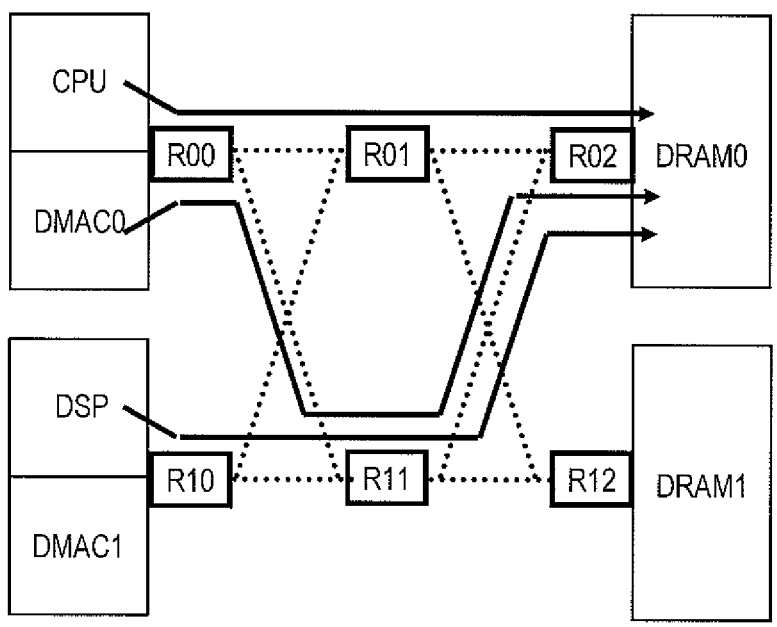
FIG. 9 shows how CPU continues to use the route 000102 and DMAC0 has changed the routes into the route 001102 as a result of probability-based route change processing.

FIG. 9 shows how the CPU continues to use the route 000102 and DMAC0 has changed the routes into the route 001102 as a result of such probability-based route change processing. Although the access route for the CPU remains 000102, the access route for DMAC0 has changed into 001102. As a result, the latency of the route leading from the CPU to DRAM0 decreases from 112 cycles to 62 cycles. Meanwhile, as the access route for DMAC0 has changed from 000102 into 001102, the latency decreases from 112 cycles to 62 cycles. Furthermore, the DSP also accesses DRAM0 at a latency of 62 cycles by adopting the same route 101102. It can be seen that the access flows are distributed over every link between the router nodes on the route leading to DRAM0, and the data transfer range is used highly efficiently.

Hereinafter, an exemplary configuration for a bus controller that performs such an operation will be described with reference to FIG. 10.

Figure 10:
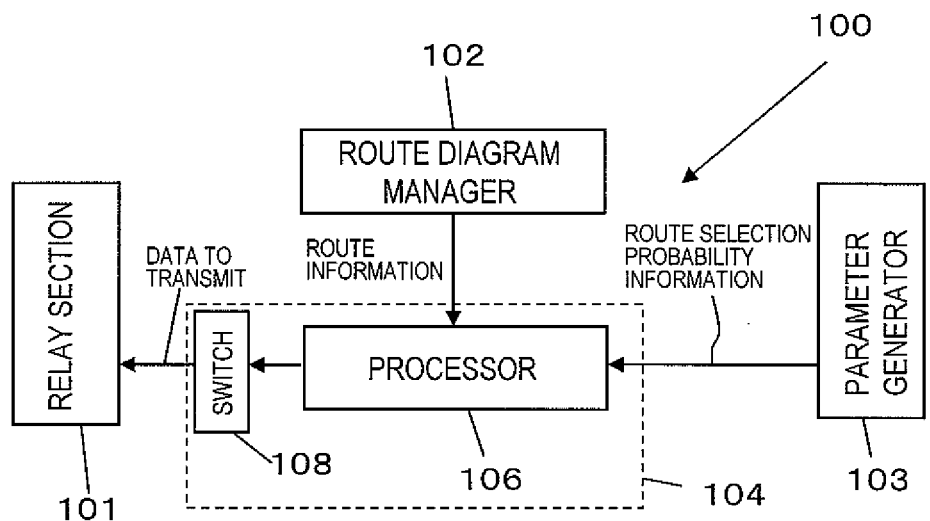
FIG. 10 illustrates an exemplary configuration for a bus controller 100 as an embodiment of the present disclosure.

FIG. 10 illustrates an exemplary configuration for a bus controller 100 as an embodiment of the present disclosure.

The bus controller includes a relay 101, a route diagram manager 102, a parameter generator 103 and a route changer 104. Hereinafter, the functions of these components will be described one by one.

(Relay 101)

A memory on the network bus is accessed on a packet-by-packet basis. The relay 101 receives a packet, refers to the destination address described in that packet, and sends that packet to an adjacent router or a memory such as a DRAM.

Figure 11:
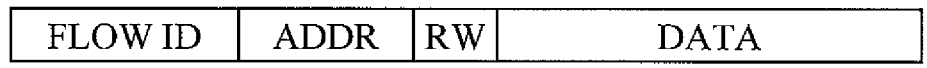
FIG. 11 illustrates an exemplary format for a packet to be written on a memory to be accessed.

FIG. 11 illustrates an exemplary format for a packet to be written on a memory to be accessed. In this example, a packet is made up of four fields, namely, FLOW ID, ADDR, RW and DATA fields.

In the FLOW ID field, stored is an identifier which is used to identify a subject that is demanding access to a memory. The value of this field means a route change unit and a group of packets with the same value are transmitted through the same route. If a memory access is managed on an application basis, an ID uniquely allocated to each application may be stored. On the other hand, if a memory access is managed on the basis of a process, which forms an application, then a process ID may be stored. Furthermore, if the memory access is managed on the basis of an even finer task unit, then a task ID may be stored.

In the ADDR field, stored is a piece of information about a memory address at which data needs to be written. In the RW field, stored is a piece of information which is used to determine whether the given instruction is a read instruction or a write instruction. And in the DATA field, stored is the bit pattern of data to be written.

The size of a packet depends on the length of data that a memory or application to use can access at a time. That is why one packet is divided into smaller units called "flits" which can be transferred on a bus clock basis. In general, a packet is comprised of one header flit and multiple payload flits.

Figure 12:
FIG. 12 shows an exemplary format for a header flit.

FIG. 12 shows an exemplary format for the header flit. In this example, the header flit is comprised of four fields. Specifically, one of the four is MARKER field, in which a piece of information revealing its identity as a header flit is stored. Another one is LENGTH field, in which a piece of information about the number of flits is stored. Still another one is SRC field, in which ID information of the source node is stored. And the other one is DTS field, in which a piece of information to identify the memory to access and a piece of information about the route to use are stored.

Figure 13:
FIG. 13 shows an exemplary configuration for a payload flit.

FIG. 13 shows an exemplary configuration for the payload flit. In the MARKER field, a piece of information revealing its identity as a payload flit is stored. On the other hand, in the PACKET PAYLOAD field, stored is the packet shown in FIG. 11 after having been divided into an appropriate number of flits.

Figures 14, 15:
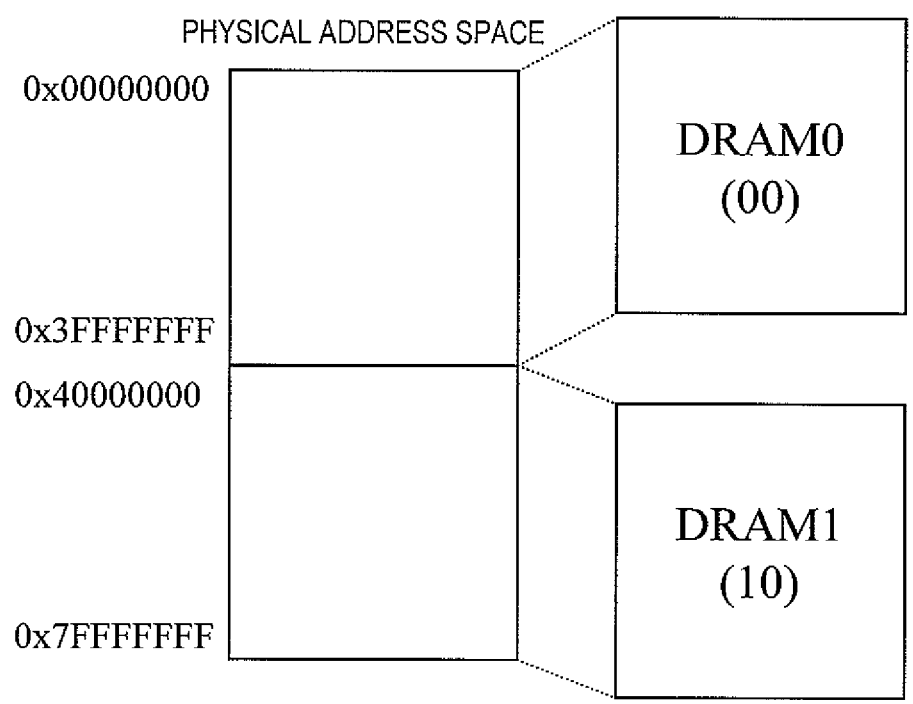
FIG. 14 illustrates an association between the physical address space and DRAM0 and DRAM1.
FIG. 15 shows an example of an address correspondence table which describes the association shown in FIG. 14.

The association of a physical address space with a piece of information to identify DRAM0 or DRAM1, which is the destination of the packet, is defined as design information on an address map. FIG. 14 illustrates an association between the physical address space and DRAM0 and DRAM1. Also, FIG. 15 shows an example of an address correspondence table which describes such an association. This address correspondence table is stored and managed in an internal memory (not shown) of a bus master. By reference to this address correspondence table, the bus master determines the destination of a packet.

As shown in FIG. 15, a memory ID "00" is allocated to an access packet in which an address falling within the range of "0x00000000" through "0x3FFFFFFF" is described, and the packet is sent to DRAM0. On the other hand, a memory ID "10" is allocated to an access packet in which an address falling within the range of "0x40000000" through "0x7FFFFFFF" is described, and the packet is sent to DRAM1. In the DST field shown in FIG. 12, stored are the route number managed by the route changer 104 and the identifier of the destination memory. In accessing DRAM0 from the CPU through the route 000102, "000" is stored in the DST. On the other hand, in accessing DRAM0 from DMAC0 through the route 001102, "100" is stored in the DST. Each router node determines the port to which the flit needs to be transferred by reading the respective bit values of the DST field that is stored in the header flit, thereby relaying the packet to DRAM0.

(Route Diagram Manager 102)

FIG. 16 shows an example of a route diagram to be managed by the route diagram manager 102 on the bus controller R00. Two routes "000102" and "001102" are available as routes leading from the router node R00 to DRAM0. Meanwhile, two routes "000112" and "001112" are available as routes leading to DRAM1. That is why the route diagram manager 102 manages these four routes on the route diagram along with their route evaluation values.

In this case, the "route evaluation value" is a value indicating the transport quality (or transmission status) of each route. For example, the communication latency of a route may be used as the route evaluation value. The communication latency of each route can be obtained by counting the number of cycles it takes to send and receive packets through the route. Alternatively, a protocol that sends and receives measuring packets to measure the latency of a route may also be used.

If the latency of a route has exceeded a predetermined threshold value (in other words, if the transport quality (or transmission status) of the route is short of a standard that has been defined in advance by the threshold value), then the route diagram manager 102 issues a route change request to the route changer 104. If the threshold value of latency is supposed to be 50, then the routes 000102 and 001102 become routes to be changed, and the route changer 104 is notified of that.

(Parameter Generator 103)

The parameter generator 103 generates either a parameter that conforms to a predetermined probability distribution or a parameter that follows a predefined rule. In this embodiment, the parameter generator 103 generates at random a plurality of value falling within the range of 0.0 through 1.0. The parameter generator 103 may be implemented as a piece of hardware for generating a random number based on thermal noise. Alternatively, the parameter generator 103 may also be implemented as a software program that generates a pseudo-random number based on a probability distribution such as a uniform distribution, a Poisson distribution or a Gaussian distribution. Optionally, a table of probabilities may also be generated by any of the methods described above and then read out. These are examples of generating parameters that conform to a probability distribution.

Meanwhile, the parameter generator 103 may also generate a parameter that follows a predetermined rule. In this description, the "predetermined rule" refers to a rule of increasing regularly the count of a counter, which can either increase or decrease its count regularly from 0.01 through 1, on a 0.01 basis every predetermined period of time. By using each value of the counter as a parameter, the routes to be changed when a plurality of bus masters are going to change their routes at the same time will be distributed. Consequently, it is possible to avoid the contention over the limited route resource as shown in FIG. 8.

(Route Changer 104)

The route changer 104 includes a processor 106 and a switch 108. The processor 106 determines which route should be selected according to the heaviness of the load on the bus. The switch 108 switches the old route into a new route that has been newly selected by the processor 106. In this description, "to change the routes" refers herein to either changing the routers to send a packet (or flits) or changing the routers to relay on the transmission route. Optionally, the processor 106 and the switch 108 do not have to be provided as hardware components but may have their functions performed as a module program.

The processor 106 manages a flow diagram such as the one shown in FIG. 17. With respect to each flow that is accessing a memory through the route that needs to be changed in response to the route change request issued by the route diagram manager 102, the processor 106 determines to which route the former route should be switched. And the switch 108 switches the old route into the new route that has been selected by the processor 106. FIG. 18 shows what the flow diagram is like when a route, of which the flow has a flow ID of 2, has been changed. Hereinafter, the processing of changing the flow routes will be described in detail with reference to FIG. 19. In the following example, the status represented by the flow diagram shown in FIG. 17 is supposed to be changed into the status represented by the flow diagram shown in FIG. 18. In FIG. 17, the flows with flow IDs of 1 and 2 are supposed to use the route 000102 to send the packet or flits, while the flow with a flow ID of 3 is supposed to use the route 101102 to send the packet or flits.

Figure 19:
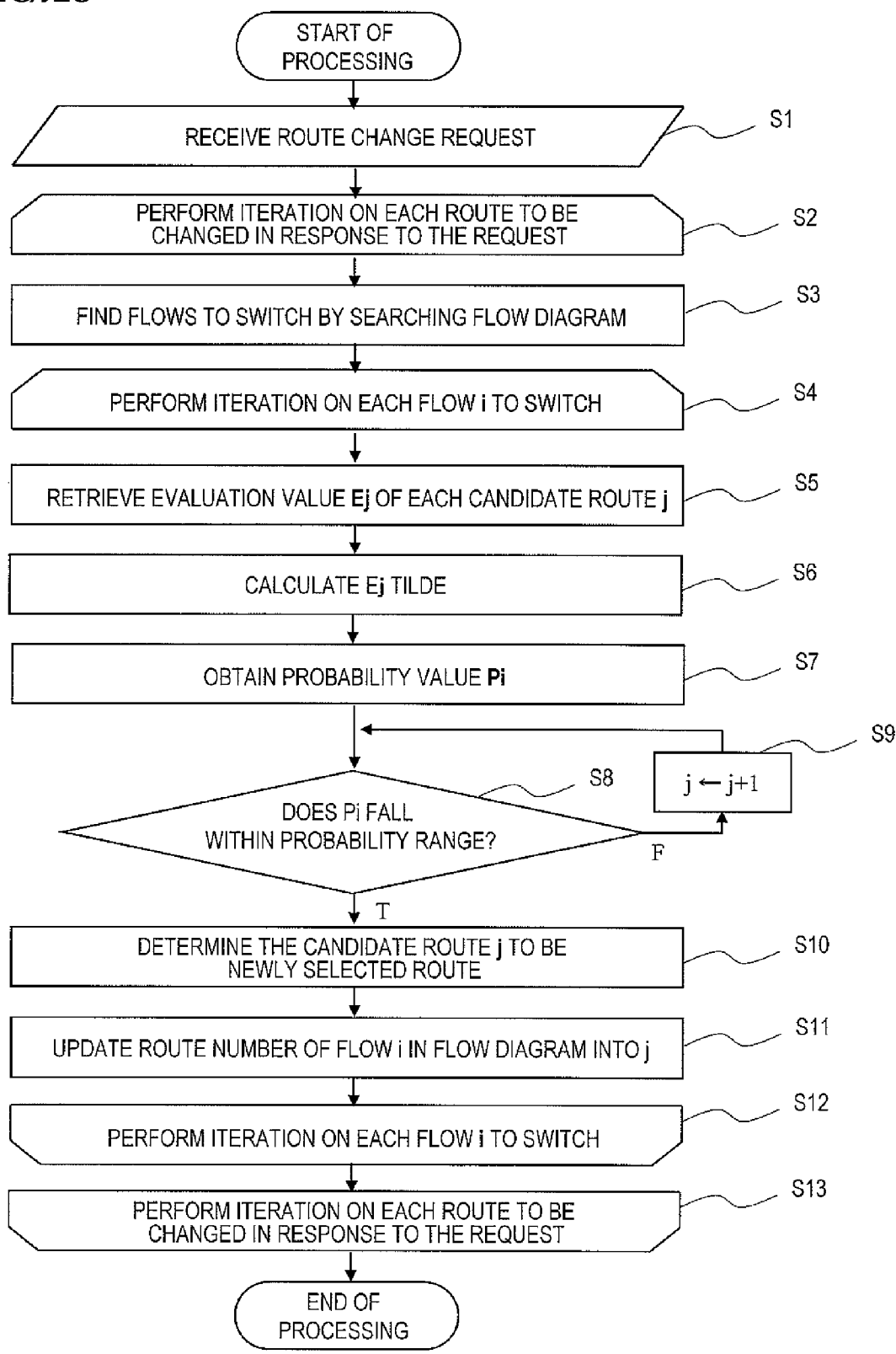
FIG. 19 is a flowchart showing the procedure of the processing to be carried out by the route changer 104.

FIG. 19 shows the procedure of the processing to be carried out by the route changer 104.

First of all, the processor 106 of the route changer 104 receives a route change request with respect to the route 000102 from the route diagram manager 102 (in Step S1). In this processing step, the processor 106 performs iteration on each of the routes that needs to be changed in response to the request by reference to the flow diagram shown in FIG. 17 (in Step S2). As a result, the flows 1 and 2 that are managed in FIG. 17 are recognized as flows, of which the routes need to be changed (in Step S3). Next, the processor 106 performs iteration on each flow i to be switched (in Step S4).

By reference to the route diagram that is managed by the route diagram manager 102, the processor 106 retrieves the route evaluation values E1 and E2 of the routes 000102 and 001102, which are candidate routes to switch that are associated with DRAM0 with a memory ID "00", from the route diagram that is managed by the route diagram manager 102 (in Step S5).

If the route evaluation values E1 and E2 are 112 and 62, respectively, as shown in FIG. 16, then the processor 106 obtains E1 tilde and E2 tilde, which are the ratios of their inverse numbers (in Step S6). In this example, E1 tilde=62/(112+62)=0.4 and E2 tilde=112 (112+62)=0.6. Next, as probability values associated with the flows 1 and 2, of which the routes need to be changed, two probability values P1 and P2 are obtained from the parameter generator 103 (in Step S7). Supposing the respective probability value P1 and P2 are 0.2 and 0.7, the routes to be changed can be determined based on the following relation (in Step S8). That is to say, with respect to the flow 1, the routes are changed under the following conditions:

0≤P1<0.6→if P1 is smaller than 0.6 (=E2 tilde), then the routes are changed into 000102, 0.6≤P1≤1.0→if P1 is equal to or greater than 0.6 (=E2 tilde) and equal to or smaller than 1.0 (=E1 tilde+E2 tilde), then the routes are changed into 001102.

On the other hand, with respect to the flow 2, the routes are changed under the following conditions:

0≤P2<0.6→if P2 is smaller than 0.6 (=E2 tilde), then the routes are changed into 000102, 0.6≤P2≤1.0→if P2 is equal to or greater than 0.6 (=E2 tilde) and equal to or smaller than 1.0 (==E1 tilde+E2 tilde), then the routes are changed into 001102.

As can be seen from the foregoing description, it can be said that the E2 tilde described above is used as selection probability.

As a result, the processor 106 updates the flow diagram as shown in FIG. 18. Specifically, the route of the flow 1 remains the route 000102 but the route of the flow 2 is switched into the route 001102 (in Step S11). Consequently, the switch 108 switches the route of the flow 2 into the route 001102. Thereafter, the processor 106 performs iteration on each flow i to be switched (in Step S12) and then performs iteration on each route to which the route change request has been issued (in Step S13). By performing these processing steps, the flows can be distributed over multiple routes available on a probability basis, and therefore, contention over the same route can be minimized. It should be noted that the processing of switching the route of the flow 2 into the route 001102 corresponds to the processing of changing the packet (or flit) sending routers from R00 into R11 shown in FIG. 5.

The processing described above is the simplest one to be carried out when there are only two candidate routes. Thus, it will be described more generally next what processing needs to be carried out when there are a lot of candidate routes. In the following example, supposing there are N candidate routes and the route evaluation value of each of those candidate routes is Ei, a normalized value Ei tilde may be calculated in Step S6 by the following Equation (3) in order to calculate the ratio to define a probability value range:

$$\tilde{E}_i = \frac{E_i^{-1}}{\sum_n E_n^{-1}} \quad (3)$$

If the probability value Pi that has been generated using the Ei tilde described above in Step S8 falls within the probability range represented by the following Inequality (4), then a candidate route j is determined to be the newly selected route:

$$\sum_{k=0}^{j-1} \tilde{E}_k \leq P_i < \sum_{k=0}^{j} \tilde{E}_k \quad (4)$$

In this case, the condition represented by the following Equation (5) needs to be satisfied:

$$\tilde{E}_0 = 0 \quad (5)$$

Also, if rate information such as the average rate of each flow is available, the Ei tilde value with respect to the route currently used may be corrected as in the following Equation (6):

$$\tilde{E}_i' = (1 + w \cdot u(r - r_{th})) \cdot \tilde{E}_i \quad (6)$$

where w is a correction coefficient, u(•) is a step function, r is the average rate value of the flow, and rth is a threshold value indicating whether or not correction needs to be made.

As a result, the chances that a high-rate flow moves to another route diminish, while the chances that a low-rate flow moves increase. In an application where a plurality of memory access flows running through the bus have a significant rate variation (i.e., in a situation where there are high-rate flows and low-rate flows in the same mix), the operation of the chip can be further stabilized by changing the routes so as to pass low-rate flows preferentially because contention of multiple high-rate flows on the newly selected route would affect other flows significantly. By making such a probability-based route selection, it is possible to avoid always selecting low-load routes. Consequently, a decrease in throughput to be caused by contention over a limited resource when the routes are selected selfishly as in the known method can be minimized.

It should be noted that Equation (6) does not have to be used to make the correction. Alternatively, the Ei tilde value may also be defined by using a sigmoid function as in the following Equation (7). Still alternatively, a weight may also be added by any other more complicated method.

$$\tilde{E}_i' = \frac{w}{1 + \exp(-K \cdot (r - r_{th}))} \quad (7)$$

where K is a coefficient that is used to adjust the degree of change of correction in the vicinity of rth.

Although the route evaluation value Ei retrieved is converted into Ei tilde in the processing step S6, this part may be provided in advance as a conversion table. In that case, in Step S6, the conversion table is searched using, as a search key, the route evaluation value Ei that has been retrieved in Step S5, thereby getting the Ei tilde value that has been stored on the table in advance. By using such a conversion table, the computations that need to be made to get the conversion processing done can be carried out in a shorter time.

An embodiment of the present disclosure has been described. In the foregoing description of embodiments, after a route has been newly selected, the old route is supposed to be switched into the new one and then data to transmit is supposed to be sent through the new route. However, the apparatus of the present disclosure does not have to perform the processing of actually switching the route but may stop with the processing of selecting a new route. In that case, the processing of switching the route may also be performed by an existent bus controller under the instruction given by the apparatus of the present disclosure. That is why the switch 108 and the relay 101 shown in FIG. 10 may be omitted then.

In that modified example, the following points should be kept in mind.

Since the bus controller has been described as a router node in the foregoing description, the bus controller with no relay 101 would no longer be a bus controller in the strictest meaning of the word. However, this is only a matter of expression. A configuration without the relay 101 still falls in the category of a bus controller because the apparatus can still control the change of data transfer routes. Alternatively, this configuration may also be regarded as a "control unit" that instructs a general bus controller to change transmission routes.

Figure 20:
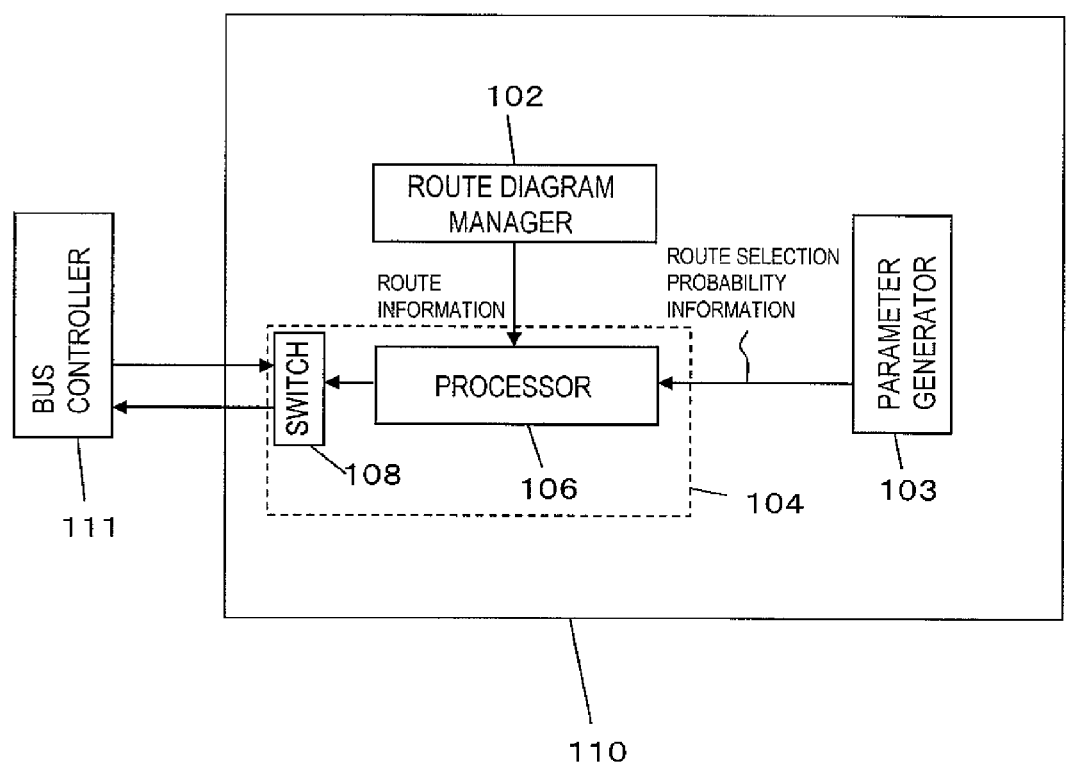
FIG. 20 illustrates an exemplary configuration for a control unit which instructs a bus controller to change transmission routes.

FIG. 20 illustrates an exemplary configuration for a control unit 110. The route changer 104 of this control unit 110 receives a packet (received data) from a general bus controller 111 and performs the processing described above (of which the description is omitted herein), thereby determining an output route for that packet. Then, the route changer 104 not only issues an instruction on the transmission route so that data will be sent through the transmission route newly selected but also sends the packet (data to transmit) to the general bus controller 111.

Even though the memory is supposed to be a DRAM in the embodiment described above, the memory may also be an on-chip memory such as an SRAM or a cache memory. Furthermore, the present disclosure is applicable to not only such communications between a bus master and a memory but also a communications network between processors. In addition, the topology may also be a mesh network, a torus network, or any other multi-stage connection network. Moreover, the present disclosure may also be implemented as an algorithm on a software simulator which is used to estimate the transport performance and power dissipation during a chip design process. By applying an embodiment of the present disclosure to such a design tool, the performance enhancement of a chip can be verified during an evaluation stage before masking.

The present disclosure is applicable to a network bus controller, control method and control program which use a data transfer route control technology on an on-chip bus at an SoC for an integral device, a general-purpose processor, or a local bus on a DSP.

While the present disclosure has been described with respect to preferred embodiments thereof, it will be apparent to those skilled in the art that the disclosed technique may be modified in numerous ways and may assume many embodiments other than those specifically described above. Accordingly, it is intended by the appended claims to cover all modifications of the disclosure that fall within the true spirit and scope of the invention.

What is claimed is:

1. A bus controller which is arranged on a plurality of network communication buses that connect together a plurality of bus masters, each sending out a packet, and at least one node, to which the packet is sent from each said bus master, in order to control the transmission route of a packet that is flowing through the plurality of communication buses, the bus controller comprising:
 a route diagram manager configured to manage a plurality of transmission routes leading from the respective bus masters to the at least one node and their respective transmission statuses;
 a parameter generator configured to generate either a parameter that conforms to a predetermined probability distribution or a parameter that follows a predefined rule;
 a processor configured to determine the transmission routes leading from the respective bus masters to the at least one node based on the respective transmission statuses of the transmission routes and the parameter so that the packets sent out from the bus masters are distributed over the plurality of transmission routes; and
 a relay configured to perform relay processing on the packet that is flowing through the communication buses following the transmission routes that have been determined by the processor.

2. The bus controller of claim 1, further comprising a switch configured to switch the packet's transmission route into a new transmission route that has been newly selected by the processor,
 wherein the relay transmits the packet through the new transmission route to which the older route has been switched by the switch.

3. The bus controller of claim 1, wherein by seeing if the parameter falls within a selection probability range to be calculated based on an evaluation value indicating the transmission status, the processor determines whether or not to switch to a transmission route associated with the selection probability.

4. The bus controller of claim 1, wherein the processor selects the route by reference to a probability distribution which is proportional to the smoothness of the transmission statuses of the respective routes.

5. The bus controller of claim 4, wherein with respect to the flow of a packet, of which the transfer rate is higher than a reference value, the processor corrects the selection probability of the route currently used and limits route switching probability.

6. The bus controller of claim 3, wherein the route diagram manager finds a route, of which the transmission status is short of a predefined standard, as a route to be switched, and
 wherein the parameter generator generates the parameter by using either a random number that is based on thermal noise or a random number that is based on a uniform distribution, a Poisson distribution or a Gaussian distribution, and
 wherein the processor calculates, with respect to the flow of a packet to be transmitted through the route to be switched, an evaluation value that increases as the transmission status worsens, and sees if the parameter falls within the range of the evaluation value, thereby determining whether or not the route needs to be switched into a transmission route associated with the evaluation value.

7. The bus controller of claim 3, wherein the route diagram manager finds a route, of which the transmission status is short of a predefined standard, as a route to be switched, and
 wherein the parameter generator generates the parameter by using a counter that changes regularly, and
 wherein the processor calculates, with respect to the flow of a packet to be transmitted through the route to be switched, an evaluation value that increases as the transmission status worsens, and sees if the parameter falls within the range of the evaluation value, thereby determining whether or not the route needs to be switched into a transmission route associated with the evaluation value.

8. A control unit which outputs an instruction to a bus controller that is arranged on a plurality of network communication buses that connect together a plurality of bus masters, each sending out a packet, and at least one node, to which the packet is sent from each said bus master, in order to control the transmission route of a packet that is flowing through the plurality of communication buses, the control unit comprising:
 a route diagram manager which manages a plurality of transmission routes leading from the respective bus masters to the at least one node and their respective transmission statuses;
 a parameter generator configured to generate either a parameter that conforms to a predetermined probability distribution or a parameter that follows a predefined rule; and
 a processor configured to determine the transmission routes leading from the respective bus masters to the at least one node based on the respective transmission statuses of the transmission routes and the parameter so that the packets sent out from the bus masters are distributed over the plurality of transmission routes and configured to output an instruction on the transmission routes that have been determined to the bus controller.

* * * * *